US005100324A

United States Patent [19]

Slayton

[11] Patent Number: 5,100,324

[45] Date of Patent: Mar. 31, 1992

[54] PRE-SCHOOL STENCIL KIT

[75] Inventor: Nancy D. Slayton, West Carrollton, Ohio

[73] Assignee: Dart Industries Inc., Deerfield, Ill.

[21] Appl. No.: 560,519

[22] Filed: Jul. 31, 1990

[51] Int. Cl.[5] B43L 13/20; G09B 11/04

[52] U.S. Cl. 434/87; 33/564; 33/565; 101/127.1; 206/575; 206/579; 206/1.7; 425/811

[58] Field of Search 33/562-565; 434/160, 161, 159, 163, 164 X, 85, 86, 87, 88, 429; 101/127.1, 126, 114, 128.21, 128.4, 129, 127; 206/575, 579, 224, 1.7, 1.8; 425/811; 443/953

[56] References Cited

U.S. PATENT DOCUMENTS

| | | | |
|---|---|---|---|
| 2,570,806 | 10/1951 | Henry | 434/87 |
| 3,352,616 | 11/1967 | Linger | 206/1.7 X |
| 3,506,324 | 4/1970 | Fristedt | 434/85 |
| 3,633,286 | 1/1972 | Maurer | 434/87 |
| 3,650,589 | 3/1972 | Linger | 206/1.7 X |
| 3,786,913 | 1/1974 | Crawford | 206/1.8 |
| 3,818,615 | 6/1974 | Jimenez | 434/164 |
| 3,861,066 | 1/1975 | Klaja | 434/87 |
| 3,945,490 | 3/1976 | Thompson | 206/1.7 |
| 4,604,062 | 8/1986 | Woods | 434/88 |
| 4,836,783 | 6/1989 | Harper | 434/87 |
| 4,998,883 | 3/1991 | Brinkley | 434/159 |

*Primary Examiner*—Edgar S. Burr
*Assistant Examiner*—Moshe I. Cohen
*Attorney, Agent, or Firm*—John A. Doninger

[57] ABSTRACT

A stencil kit including a case, a drawing panel releasably mountable to said case in the manner of a cover, and multiple stencils selectively mounted to drawing surfaces formed on opposite faces of the drawing panel. The drawing panel includes an integral handle, which, upon a mounting of the drawing panel to the case, provides a handle for the entire kit. Interengaging lugs and a latch and keeper assembly provide for releasable joinder of the drawing panel to the case. Positioning flanges, projections and recesses about each drawing surface and on the associated stencils releasably position the stencils for use.

22 Claims, 4 Drawing Sheets

PRE-SCHOOL STENCIL KIT

BACKGROUND OF THE INVENTION

The present invention generally relates to drawings devices and is more particularly concerned with stencils or templates of the type having openings therein representative of a figure, letter, shape, or the like which is to be reproduced on a subjacent surface by a drawing instrument guided within the stencil opening. Such devices, whether used by adults, for example as a letter guide, or by children as an amusement or education means, normally involve multiple individual stencils, individual sheets of paper and drawing implements The several components associated with a stencil device necessitate the provision of means for storing the components, as well as protecting the components, and in particular the normally thin and possibly flexible stencils.

When providing stencil devices for young children, for example pre-school children, other problems must be dealt with including difficulties which might be encountered by the child in handling, positioning and using the components to produce an acceptable reproduction. In conjunction therewith, and if the stencil device is to be attractive to a child, it is desirable that the device be viewed as a toy by the child, notwithstanding the possible educational benefits derived from its use.

SUMMARY OF THE INVENTION

It is a principal object of the present invention to provide a stencil device which is particularly adapted for use by pre-school children, enabling them to create recognizable images easily, and at the same time enhancing creativity of children in their pre-school years. The device uniquely combines the ability to accommodate casual treatment by a child while at the same time providing, in a simple manner, for ease of handling and manipulation of the components, and in particular the positioning and retention of the stencils during use in "no hands" manner which will make the device attractive to a young child.

In conjunction therewith, it is a significant object of the invention to provide the stencil device as a self-contained assemblage of components, providing both storage and use facilities which particularly accommodate the abilities of a young child.

The present invention is basically a kit which combines all of the components into a self-containing assembly easily handled and used by a small child.

The kit includes a rectangular storage case with a drawing panel engageable across the open face of the case in the manner of a cover. The case is of a sufficient depth to accommodate stencil supplies, including the stencils, paper, drawing instruments, and the like. The drawing panel is releasably snap-locked into position for selective removal both for access to the contents of the case and for use of the panel separately from the case. The drawing panel includes an integral handle for the carrying of the drawing panel and for use as a handle for the entire kit upon an assembly of the drawing panel to the case.

The drawing panel includes opposed planar drawing surfaces for selective use with either surface uppermost. One of the drawing surfaces is provided with one or two textured areas whereby stencil-guided drawings produced thereon will include a textured appearance, thus providing for variety in the produced design or the like. The textured surface can also be provided with slightly raised numbers along the bottom portion thereof.

Positioning flanges in association with each drawing surface receive and at least partially encircle individual stencils for retention thereof during use by the child. Complementary projections on the stencils and recesses within the positioning flanges further secure and retain the stencils during use and facilitate a proper positioning of the stencil.

The drawing panel is useable both mounted to the case, wherein the case functions in the manner of a low table or support, and independently of the case.

Once a child has chosen the image he would like to produce, he will take an 8½"×11" sheet of paper, fold it in half and place it into the frame on the drawing surface. The single or dual stencil simply slides into the position automatically, and the image is created by scribbling etc.

Each stencil preferably contains the name of each accompanying image for beginning reading and optional letter development. The single or half-size stencils can be combined to make message cards or notes. This toy develops a child's dexterity, word and shape association as well as teaching early word recognition skills. Additionally, the toy will allow the child to create shapes not normally typical of their dexterity.

Additional objects and advantages considered to reside in the stencil kit of the invention will also become apparent from the more specific description of the invention following hereinafter.

DESCRIPTION OF PREFERRED EMBODIMENT

Figure 1:
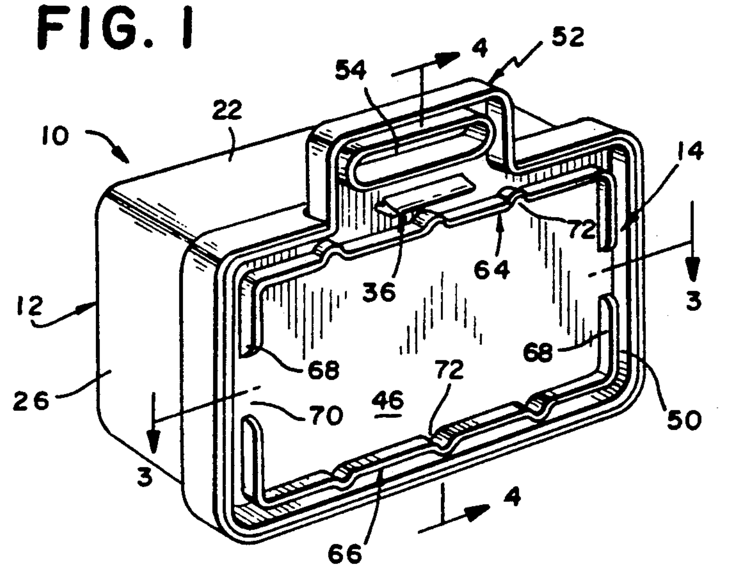
FIG. 1 is a perspective view of the stencil kit of the invention.

Referring now more specifically to the drawings, the stencil kit 10 consists of a storage case 12, a drawing panel 14 and stencils, including single stencils 15 and dual stencils 18. The kit will, in the manner of a conventional stencil, be used with paper or other appropriate sheets of image receiving material, and drawing instruments, including pencils, crayons and the like.

Figure 2:
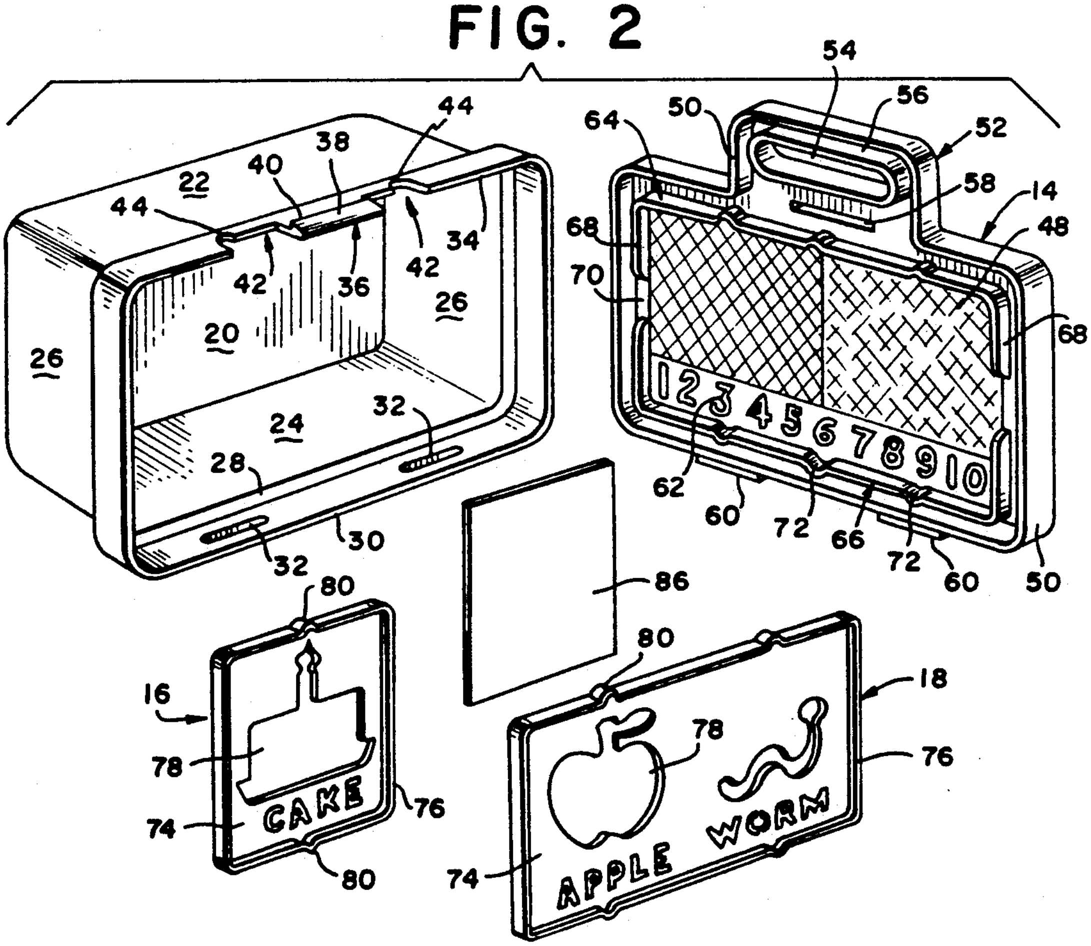
FIG. 2 is an exploded perspective view of the kit, including a sheet of paper.
Figure 3:
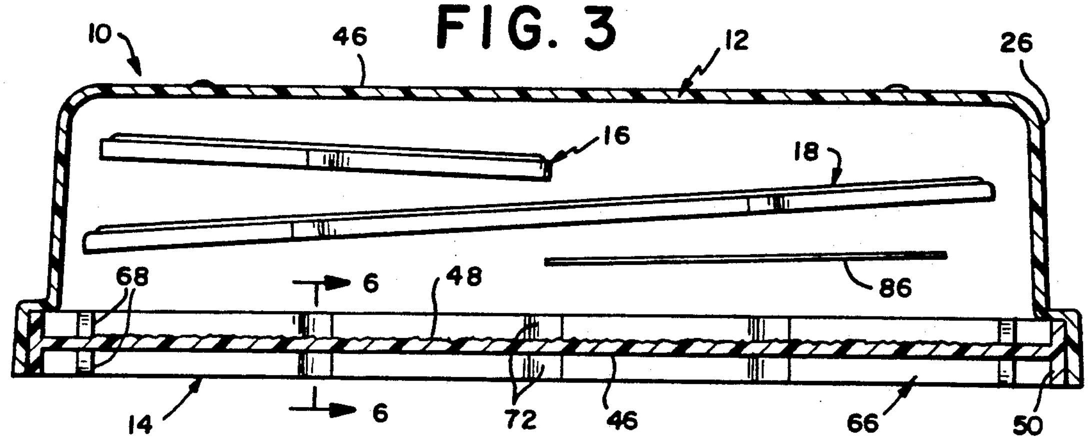
FIG. 3 is an enlarged horizontal cross-sectional view taken substantially on a plane passing along line 3—3 in FIG. 1.
Figure 4:
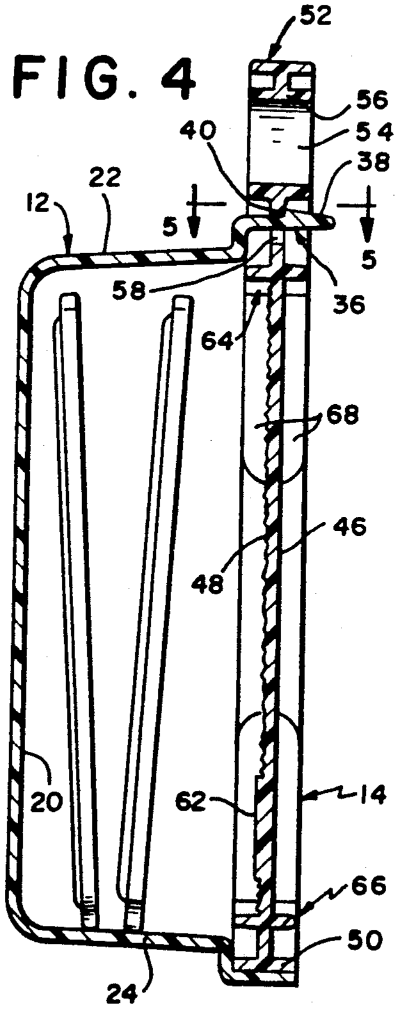
FIG. 4 is an enlarged vertical cross-sectional view taken substantially on a plane passing along line 4—4 in FIG. 1.

The case 12 is preferably rectangular and of one-piece molded construction with a closed bottom 20 and peripheral walls extending therefrom and defining an open mouth or top. With reference to the case 12 vertically oriented in its carrying position as illustrated in FIGS. 1 and 2, the peripheral walls include an upper wall 22, a lower wall 24, and opposed side walls 26, each of which terminates in a free outer edge.

Each of the case walls, for a minor portion of the height thereof from the corresponding outer edge, is offset to define a continuous inwardly directed support ledge or shoulder 28 completely about the interior of the case 12.

The lower wall 24, between the outer edge 30 thereof and the ledge 28, is provided with a pair of spaced elongate slots or recesses 32 which parallel the outer edge 30.

The outer edge 34 of the upper wall 22 is interrupted along the central section thereof and includes, as an integral extension of the upper wall 22 beyond the defined ledge 28 therein, a coplanar latch 36 with an enlarged outwardly tapered leading end portion 38 defining, along the length of the latch 36, a rearwardly directed locking shoulder 40.

To each side of the central latch 36, the upper wall 22, outward of the shoulder 28, includes an inwardly extending pair of rectangular recesses 42. Each recess 42, along the edge thereof laterally remote from the central latch 36, includes a recess extension 44 extending inwardly of the inner edge of the recess 42 and terminating approximately at the ledge 28.

The drawing panel 14 is configured to lie across the open top of the case 12 and nest in seated engagement upon the peripheral ledge 28. As such, the drawing panel 14 is also preferably rectangular.

More specifically, the drawing panel 14, with opposed planar drawing surfaces 46 and 48, includes a continuous support flange 50 about the peripheral edge of the panel 14 with the support flange 50 projecting to an equal height beyond both drawing surfaces 46 and 48.

The upper edge portion of the drawing panel 14, centrally along a major portion thereof, is provided with an upwardly directed integral extension defining a handle 52. The handle 52 is elongate with the support flange 50 of the drawing panel 14 extending continuously about the outer or free periphery of the handle 52. An enlarged hand-accommodating slot hole 54 is provided longitudinally along the handle 52 paralleling the upper edge thereof in inwardly spaced relation thereto. The slot 54, for rigidity and to provide a comfortable hand grip, is provided with an integral annular flange 56 about the peripheral edge thereof. The flange 56, projects laterally to each side of the panel 14 to a height no greater than that of the support flange 50.

An elongate latch keeper slot 58 is provided through the drawing panel 14 parallel to and slightly spaced below the hand hole 54. The slot 58 is wider than the thickness of the support flange 50 and, while generally linearly aligned with the portions of the support flange 50 to the opposite sides of the handle 52 along the upper edge portion of the drawing panel 14, also extends to a height sufficiently above the support flange 50 to accommodate the latch 36 as shall be explained presently.

The lower edge portion of the drawing panel 14 includes a pair of lugs 60 spaced therealong and projecting from flange 50 at positions corresponding to the positions of the case slots 32 for selective reception therein when mounting the drawing panel 14 to the case 12.

Figure 5:
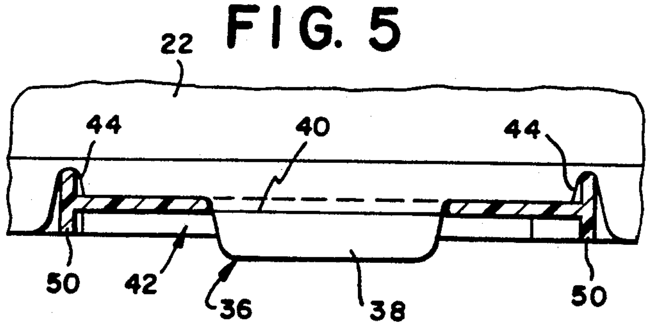
FIG. 5 is detail sectional view of the engagement of the drawing panel in the case at the handle area and taken substantially on a plane passing along line 5—5 in FIG. 4.
Figure 6:
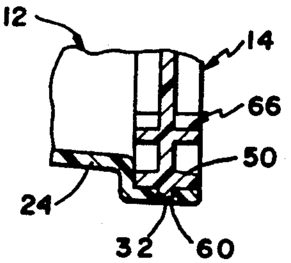
FIG. 6 is a detail sectional view taken substantially on plane passing along line 6—6 in FIG. 3.

It will be recognized that in mounting the drawing panel 14 to the case 12, the child need merely align the drawing panel 14 generally over the open mouth of the case 12, introduce the lugs 60 within the case slots 32, and swing or pivot the drawing panel inwardly with the latch 36 snap-locking into position by a slight flexing thereof to allow the leading end 38 to pass through the drawing panel slot 58 and engage locking shoulder 40. The support flange 50 will snugly seat on the case support ledge 28, and the handle 54, and in particular the side portions thereof, will engage within the recesses 42. The recess extensions 44, noting FIG. 5, will accommodate the inwardly directed aligned portions of the support flange 50 of the drawing panel 14. The height of the support flange 50 is substantially equal to the depth of the case walls between the outer edges thereof and support ledge 28 whereby a completely nested arrangement is provided with the projecting handle 52 of the mounted drawing panel 14 extending upwardly from the upper wall 22 of the case 12 inward of the outer edge thereof. Release of the drawing panel 14 from the case 12 is easily effected by a young child through a slight depression of the leading end portion 38 of the latch 36 to disengage the latch shoulder 40 and allow for a forward removal of the drawing panel Notwithstanding the simplicity of the closing and opening of the case, the drawing panel 14, when latched in position, provides a positive and secure cover and carrying handle for the kit.

An additional and significant function of the drawing panel 14 is to provide support and alignment means for stencils 16, 18 which particularly adapt the kit for use by young or pre-school children. The opposed drawing surfaces 46 and 48 differ slightly in that the surface 46 is smooth, while the surface 48 is slightly textured, and in fact may include two half-sections with different texture finishes which will provide a different and interesting reproduced effect easily achieved by the child user of the device rubbing a crayon thereover. The textured surface 48 can, as illustrated, also be provided with slightly raised numbers 62 along the bottom portion thereof as a learning guide for a child, the numbers being easily reproducible by placing a paper thereover and scribbling on the paper to produce a letter imprint.

The drawing surfaces include duplicate positioning means for positioning and retaining the stencils 16, 18. The positioning means includes, with regard to each drawing surface, upper and lower positioning flanges 64 and 66. These flanges 64, 66 parallel the opposed upper and lower edge portions of the drawing panel 14 in inwardly spaced relation thereto and include vertically directed end portions or extensions 68 which similarly parallel the opposed edge portions of the drawing panel 14 in inwardly spaced relation thereto. The flange portions 68 along each side edge of the panel 14, are in alignment with each other and terminate, at approximately mid-height of the drawing panel 14, in spaced relation to each other to define access openings 70 which allow for easy access to the positioned stencils, particularly for removal thereof.

Each of the positioning flanges 64, 66 along the longitudinal extent thereof includes a series, preferably three, of recesses 72 formed therein for engaging and stabilizing the stencils, in conjunction with the positioning flanges 64, 66 as shall be explained presently.

Referring now to the stencils, the dual stencil 18 is of a size and is configured to be closely received within the positioning flanges 64, 66 coextensive with the full drawing surface 46 or 48 within the confines of the positioning flanges. The finger access openings 70 defined by the positioning flange portions 68, are of particular importance in facilitating a removal of a positioned dual stencil 18 in view of the close conformance thereof to the positioning flanges 64, 66.

The single stencil 16 is approximately one half the size of the dual stencil 18, and while normally positioned to one side of a drawing surface against the vertical portions 68 of the positioning flanges 64, 66, can be positioned at intermediate positions as desired.

Each of the stencils, whether single or dual, comprises a thin flat plate 74 with a peripheral rigidifying flange 76 projecting from the top or drawing surface thereof. This flange 76 will perform dual functions, both rigidifying the relatively thin stencil plate during use and handling, and assisting a young child in confining his drawing efforts, which may be random scribbling, within the confines of the stencil.

The stencil plate 74 will include one or more openings 78 therethrough which define the shape, whether a pictorial representation of an animal or the like, letters, numbers, etc., to be reproduced on a subjacent sheet of paper or other appropriate drawing surface. As illustrated, it is preferred that each stencil include both a reproducible image and an associated name.

The positioning means for the stencils 16 and 18 further include slight projections 80 along the upper and lower portions of the peripheral support flange 76, which projections 80 are received within the recesses 72 of the positioning flanges 64, 66 of the drawing panel. As noted in the drawings, it is preferred that three recesses 72 be provided along each positioning flange 64, 66 in vertically aligned pairs. The dual stencil 18 will include two pairs of vertically aligned projections 80 which are engageable within the end-most flange recesses 72 as an additional positioning and stabilizing means for the stencil. The single stencils 16 will include a single pair of vertically aligned projections 80 which are receivable in any of the three vertically aligned pairs of positioning recesses 72 for a location of the single stencil to either end of the corresponding drawing surface 46, 48, or at a central position. As will be appreciated, other combinations of projections and recesses can be provided for varying the position of the single stencils 16.

It is preferred that the stencil 16, 18 be slightly elevated above the drawing surface in order to reduce, as much as possible, a smudging of the underlying paper and the undersurface of the stencil plate. Such smudging arises from material buildup as an expected result of scribbling by small children and the running over of the sides of a stencil opening by the drawing implement, normally a crayon.

Accordingly, the lower face of drawing plate 74 of the stencil 16, 18 is provided with an integral projecting support rib 82 peripherally about the edge thereof in inwardly spaced relation to the flange 76. In addition, support projections 84 of equal height with the rib 82, are provided and extend from selected portions of the stencil plate 74 generally in close proximity about the stencil opening 78.

Figure 7:
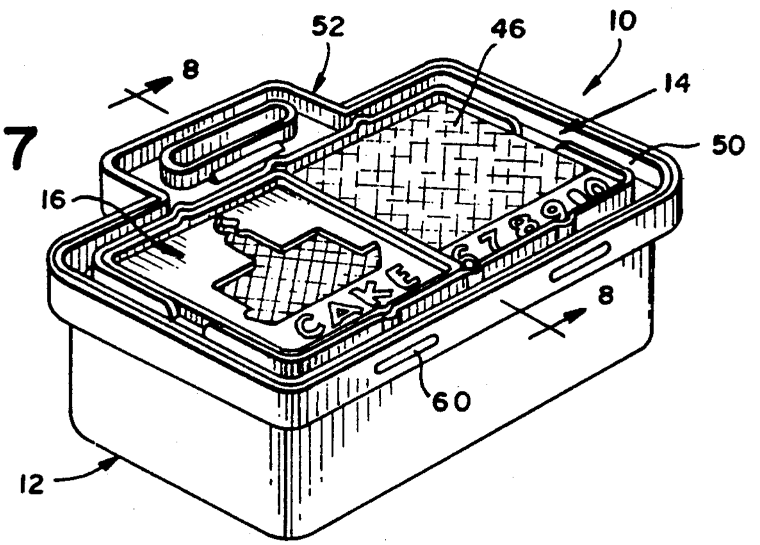
FIG. 7 is a perspective view of the kit in use.
Figure 8:
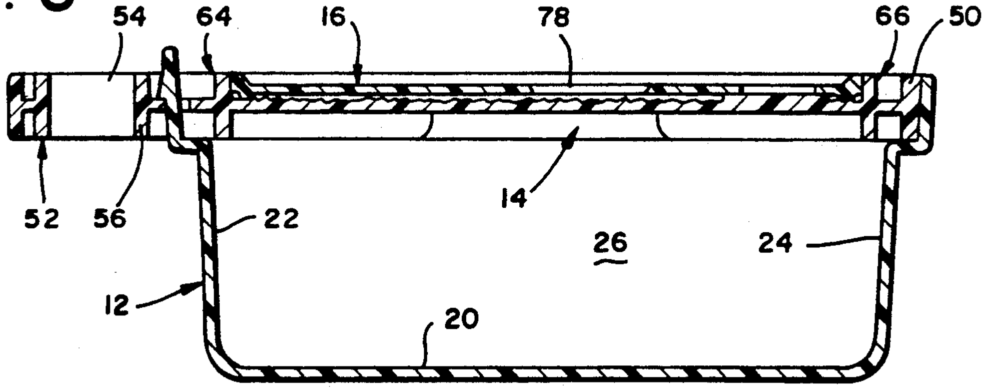
FIG. 8 is a cross-sectional view taken substantially on a plane passing along line 8—8 in FIG. 7.

As suggested in FIGS. 7 and 8, the drawing panel 14, with a mounted stencil, can be used while mounted to the case 12 as a cover or closure therefor. In this manner, the case itself provides a support table or stand for the stencil. This would be particularly convenient if the child is using the stencil in a vehicle, at the beach or the like. Incidentally, for clarity of illustration, the paper, generally indicated by reference numeral 86 in FIG. 2, and normally positioned between the stencil and drawing surface has not been illustrated in FIGS. 7 and 8.

Figure 9:
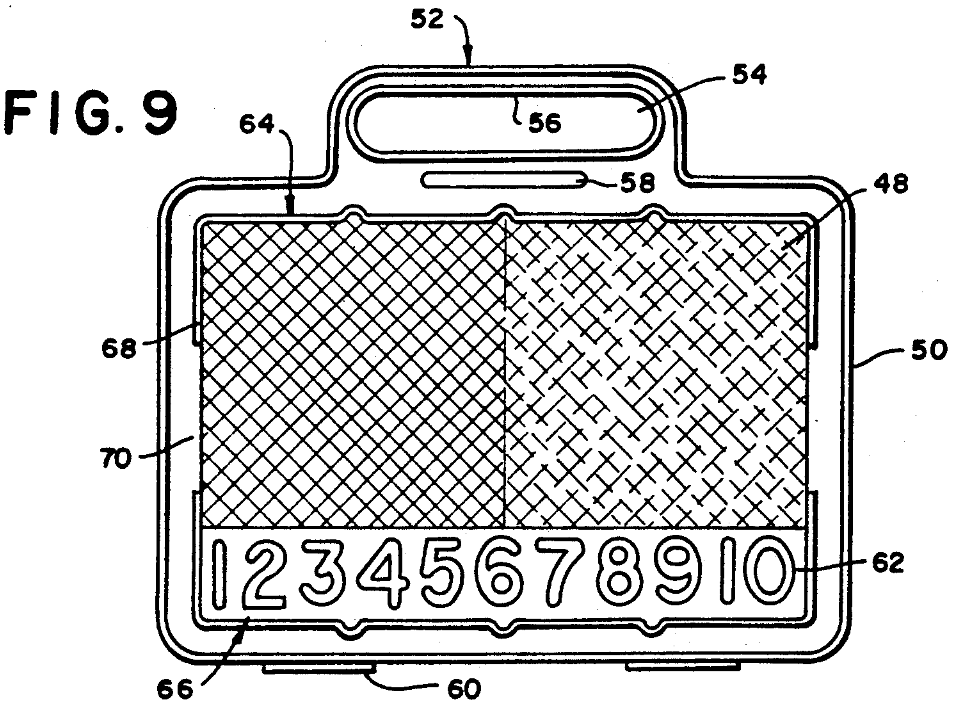
FIG. 9 is a face view of the drawing panel.
Figure 10:
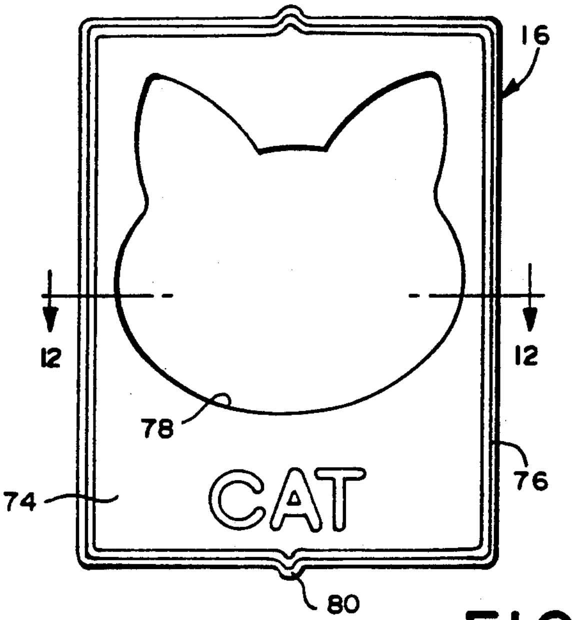
FIG. 10 is a top plan view of a typical single stencil.
Figure 11:
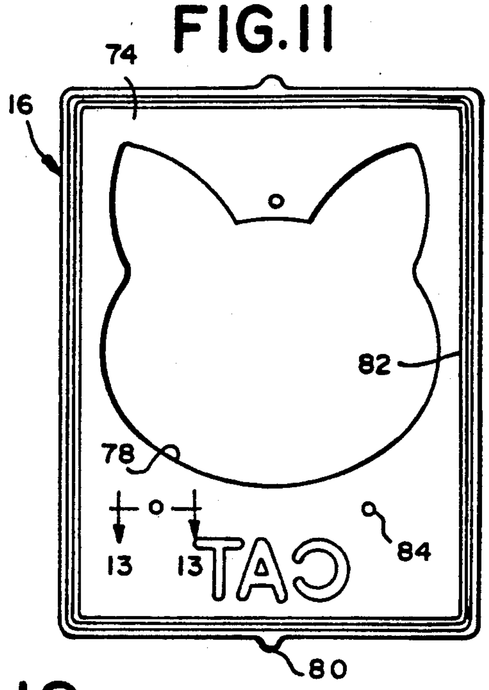
FIG. 11 is a bottom plan view of the stencil of FIG. 10.
Figure 12:
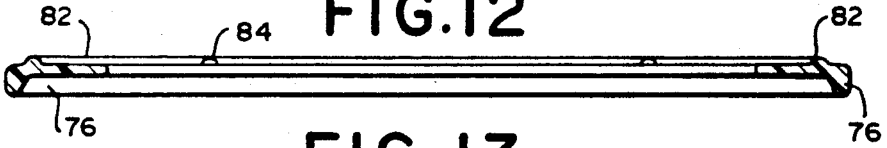
FIG. 12 is an enlarged cross-sectional view taken substantially on a plane passing along line 12—12 in FIG. 10.
Figure 13:
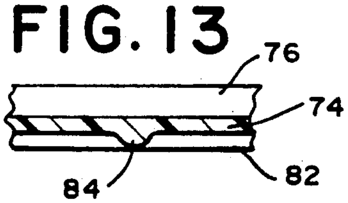
FIG. 13 is an enlarged sectional detail taken substantially on a plane passing along line 13—13 in FIG. 11.
Figure 14:
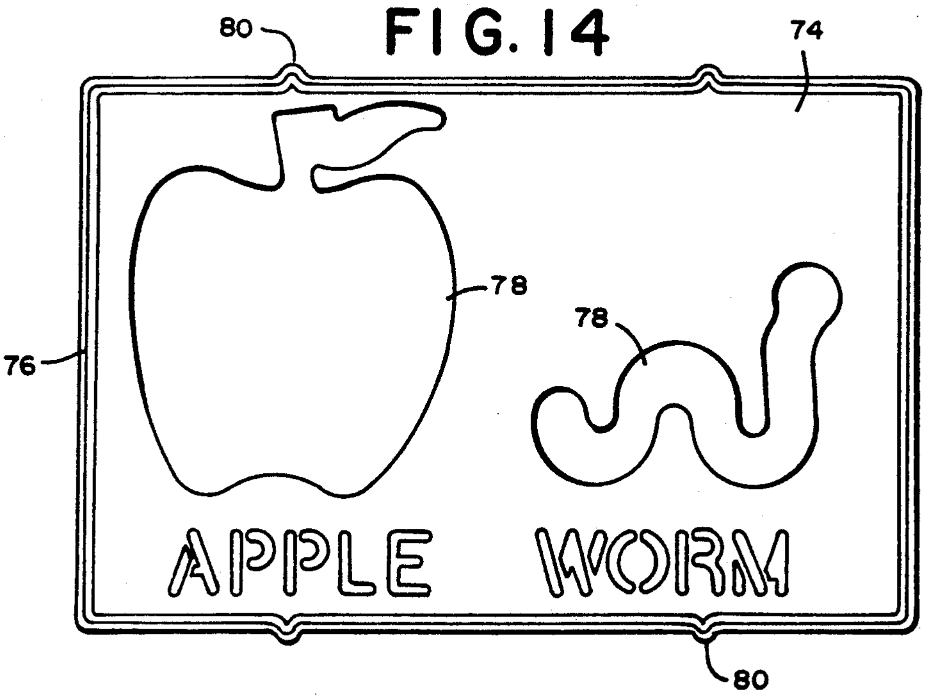
FIG. 14 is a top plan view of a typical dual stencil.

It will also be recognized, and as suggested in FIG. 9, the drawing panel 14, can be used removed from the case 12. Under such circumstances, the case 12 can function as an open top container for stencil supplies, including the alternate stencils, paper, crayons and the like.

The adaptability of the kit for use by pre-school children is enhanced by the incorporation of the enlarged handle directly into the drawing panel whereby the handle functions both as a handle for the drawing panel itself and as a handle for the complete kit.

While not limited thereto, the kit, and in particular the individual components thereof, preferably will be made of an appropriate synthetic resinous material, for example high density polyethylene.

I claim:

1. A child's stencil kit comprising a case, a drawing panel and multiple stencils, said case including a closed bottom with peripheral wall means extending from said bottom and defining an interior with an open top, said case being adapted to receive and store said stencils, said drawing panel being generally peripherally coextensive with said open top and positionable to lie across and close said open top, said drawing panel being completely separable from said case, mounting means releasably securing said drawing panel to said case across said open top, said peripheral wall means of said case including opposed upper and lower walls and side walls extending therebetween, said walls having outer edges, said drawing panel having a peripheral edge including opposed upper and lower edges and side edges extending therebetween, a handle on said drawing panel projecting from said upper edge, said handle, with said drawing panel secured to said case, extending laterally outward of said case upper wall and defining a carrying means for said case, said mounting means including at least one slot in said lower wall of said case adjacent the outer edge of said lower wall, a latch on said upper wall of said case extending outward relative to the outer edge thereof, a latch receiving keeper on said drawing panel parallel to said upper edge thereof adjacent said handle, and at least one lug on said drawing panel projecting from the lower edge thereof and receivable in said at least one slot in said lower wall of said case, whereby in positioning said drawing panel across said open top said lug is engaged in said slot and said drawing panel is pivoted thereabout toward said open top to engage said keeper with said latch, said drawing panel including opposed faces with a drawing surface defined on at least one face, and positioning means for releasably positioning selected ones of said stencils on said drawing panel in overlying relation to said drawing surface with an image receiving sheet of material therebetween.

2. The stencil kit of claim 1 wherein said upper wall of said case includes recesses in the outer edge thereof to the opposite sides of said latch generally conforming to and for receiving said handle upon securing of said drawing panel to said case and engagement of said keeper with said latch.

3. The stencil kit of claim 2 wherein said walls of said case, adjacent the outer edges thereof, are laterally offset outward relative to the interior of said case and define a support ledge within said case for receiving said drawing panel.

4. The stencil kit of claim 3 wherein said drawing panel includes a peripheral support flange, said positioning means comprising positioning flanges on said drawing panel about said drawing surface in inwardly spaced relation to said support flange, said positioning flanges including recesses formed therein and opening inward toward said drawing surface at selected points therealong, said stencils at least partially conforming to and individually receivable within said positioning flanges, said stencils including peripheral edges with projections at selected points therealong engageable with said recesses to fix the position of said stencils within said positioning flanges.

5. The stencil kit of claim 4 including access openings between adjacent positioning flanges for manual access to said stencils within said positioning flanges.

6. The stencil kit of claim 5 wherein each stencil comprises a central plate with an image defining opening therethrough, and projections on said plate for support of said plate on said drawing surface in spaced relation thereabove whereby direct contact between the plate and drawing surface is avoided.

7. The stencil kit of claim 6 wherein said drawing surface has a textured finish thereon reproducible with the stencil image on an image receiving sheet.

8. The stencil kit of claim 7 wherein said drawing surface has multiple areas each with a different textured finish.

9. The stencil kit of claim 8 including a smooth drawing surface defined on a second of said opposed faces of said drawing panel.

10. The stencil kit of claim 6 wherein each stencil central plate includes letter defining openings presenting a word description of the image defining opening 11. In a child's stencil kit, a drawing panel including opposed faces with a drawing surface on at least one face, said drawing panel including a peripheral support flange about said drawing panel, positioning flanges on said drawing panel about said drawing surface in inwardly spaced relation to said support flange, said positioning flanges including recesses formed therein and opening inward toward said drawing surface at selected points therealong, and stencils at least partially conforming to and individually receivable within said positioning flanges, said stencils including peripheral edges with projections at selected points therealong engageable with said recesses to fix the position of said stencils within said positioning flanges 12. The drawing panel of claim 11 including access openings between adjacent positioning flanges for manual access to said stencils within said positioning flanges.

13. The drawing panel of claim 12 wherein said drawing surface has a textured finish thereon reproducible with the stencil image on an image receiving sheet.

14. The drawing panel of claim 13 wherein said drawing surface has multiple areas each with a different textured finishes.

15. The drawing panel of claim 14 including a smooth drawing surface defined on a second of said opposed faces of said drawing panel.

16. The drawing panel of claim 11 including a second drawing surface on a second of said opposed faces of said drawing panel, said peripheral support flange extending to each side of said drawing panel perpendicularly beyond each of said drawing surfaces, and positioning flanges on said drawing panel about said second drawing surface duplicating said positioning flanges about the first mentioned drawing surface.

17. The drawing panel of claim 16 wherein one of said drawing surfaces has raised numeral defined along the length thereof.

18. The drawing panel of claim 16 including a peripheral edge thereabout, and a handle projecting from said peripheral edge.

19. In a child's stencil kit, a drawing panel including opposed faces with a drawing surface on at least one face, said drawing panel including a peripheral support flange about said drawing panel, positioning flange means on said drawing panel about and projecting above said drawing surface in inwardly spaced relation to said support flange, said positioning flange means having opposed flange portion providing spaced extents including recesses formed therein and opening inward toward said drawing surface at selected points therealong, and stencils at least partially conforming to and individually receivable within and confined by said positioning flange means and between said spaced extents, said stencils including peripheral edges with projections at selected points therealong engageable with said recesses to fix the position of said stencils within said positioning flange means and on said drawing surface.

20. The drawing panel of claim 19 wherein said positioning flange means includes at least one access opening laterally therethrough for manual access to a stencil confined within said positioning flange means.

21. The drawing panel of claim 20 including a drawing surface on a second of said opposed faces of said drawing panel, positioning flange means on said drawing panel about said drawing surface on said second face duplicating said positioning flange means about said first mentioned drawing surface, and a handle on said drawing panel fixed to said peripheral support flange and projecting laterally outward therefrom relative to said drawing surfaces.

22. A child's stencil kit comprising a case and a separate drawing panel, said case including a closed bottom with a peripheral wall extending from said bottom and defining an interior with an open top, said peripheral wall having an outer edge portion outwardly offset relative to said interior of said case and defining a support ledge within said case for receiving and supporting said drawing panel, said case being adapted to receive and store drawing supplies, mounting means releasably securing said drawing panel to said case across said open top for selective removal therefrom for use independently of said case, said drawing panel including a peripheral edge and opposed faces with a drawing surface defined on at least one face, said peripheral edge of said drawing panel, when said panel is secured to said case, being received on said ledge, a handle secured to and projecting from said panel peripheral edge laterally outward relative to said drawing surface and defining a carrier means for said panel independently of said case, said handle, with said drawing panel secured to said case, extending laterally outward of said case and defining a carrying means for said panel and said case, said outer edge portion of said peripheral wall of said case having recess means therein, said handle, when said drawing panel is received on said support ledge, projecting outward through said recess means and extending beyond said peripheral wall of said case for manual grasping.

* * * * *